US012657073B2

(12) United States Patent
Mishra et al.

(10) Patent No.: US 12,657,073 B2
(45) Date of Patent: Jun. 16, 2026

(54) WORKLOAD MANAGEMENT AMONG CANDIDATE DISTRIBUTED COMPUTING ENVIRONMENTS BASED ON GOVERNANCE POLICIES

(71) Applicant: Accenture Global Solutions Limited, Dublin (IE)

(72) Inventors: Soubhagya Mishra, Bhubaneswar (IN); Pragya Sharma, Mumbai (IN); Nilesh Gupta, Jaipur (IN); Ritu Pramod Dalmia, Mumbai (IN); Aniruddha Ray, Bangalore (IN); Manish Bachhania, Khirkiya (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 414 days.

(21) Appl. No.: 18/340,940

(22) Filed: Jun. 26, 2023

(65) Prior Publication Data

US 2024/0427644 A1    Dec. 26, 2024

(51) Int. Cl.
G06F 9/50        (2006.01)

(52) U.S. Cl.
CPC .......... G06F 9/5083 (2013.01); G06F 9/5072 (2013.01)

(58) Field of Classification Search
CPC .... G06F 9/5083; G06F 9/5072; G06F 9/5094; G06F 9/5027
See application file for complete search history.

(56) References Cited

U.S. PATENT DOCUMENTS

| | | | |
|---|---|---|---|
| 2021/0373973 A1* | 12/2021 | Ekins ................... | G06F 9/5088 |
| 2022/0036123 A1 | 2/2022 | Cummings et al. | |
| 2023/0017632 A1* | 1/2023 | Herb ................... | G06F 11/3006 |
| 2023/0138727 A1 | 5/2023 | Wong et al. | |
| 2023/0176914 A1 | 6/2023 | Kodama et al. | |

FOREIGN PATENT DOCUMENTS

JP        2023084517 A        6/2023

OTHER PUBLICATIONS

European Search Report for Application No. 24184516.3 dated Sep. 19, 2024, 10 Pages.

(Continued)

*Primary Examiner* — Jorge A Chu Joy-Davila
(74) *Attorney, Agent, or Firm* — Mannava & Kang, P.C.

(57)        ABSTRACT

Aspects of the present disclosure provide systems, methods, and computer-readable storage media that support workload management. A computing device may generate recommendation information for processing of the workload, the recommendation information associated with a first execution environment selected from the set of candidate execution environments based on execution information that indicates, for each candidate execution environment of the set of candidate execution environments, a carbon intensity value associated with the candidate execution environment. The computing device may output a first indicator that indicates the recommendation information.

18 Claims, 5 Drawing Sheets

400

(56)  References Cited

OTHER PUBLICATIONS

Ana Radovanovic, Ross Koningstein, Ian Schneider, Bokan Chen, Alexandre Duarte, Binz Roy, Diyue Xiao, Maya Haridasan, Patrick Hung, Nick Care, Saurav Talukdar, Eric Mullen, Kendal Smith, Mariellen Cottman, and Walfredo Cirne, Carbon-Aware Computing for Datacenters, IEEE Transaction on power systems, IEEE, USA, vol. 38, No. 2, May 5, 2022, pp. 1270-1280.

Radovanovic, Ana et al., Aware Computing for Datacenters, IEEE Transactions On Powersystems, IEEE, 2023—vol. 38 No. 2, p. 1270-1280, March, 1280.

Notice of reasons for refusal, Japanese Patent Application No. 2024-101361, dated—Oct. 7, 2025.

* cited by examiner

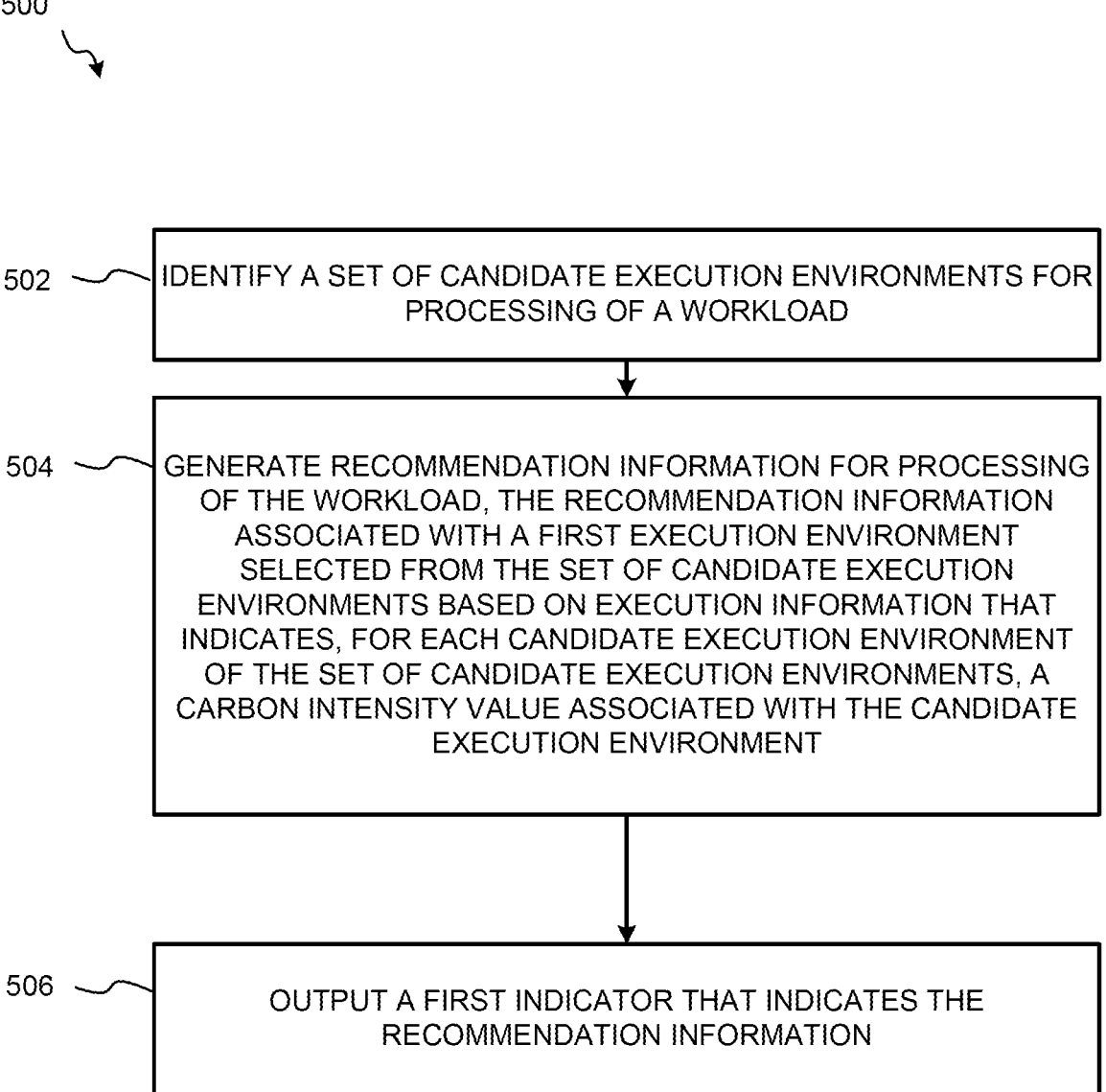

502 — IDENTIFY A SET OF CANDIDATE EXECUTION ENVIRONMENTS FOR PROCESSING OF A WORKLOAD

504 — GENERATE RECOMMENDATION INFORMATION FOR PROCESSING OF THE WORKLOAD, THE RECOMMENDATION INFORMATION ASSOCIATED WITH A FIRST EXECUTION ENVIRONMENT SELECTED FROM THE SET OF CANDIDATE EXECUTION ENVIRONMENTS BASED ON EXECUTION INFORMATION THAT INDICATES, FOR EACH CANDIDATE EXECUTION ENVIRONMENT OF THE SET OF CANDIDATE EXECUTION ENVIRONMENTS, A CARBON INTENSITY VALUE ASSOCIATED WITH THE CANDIDATE EXECUTION ENVIRONMENT

506 — OUTPUT A FIRST INDICATOR THAT INDICATES THE RECOMMENDATION INFORMATION

*FIG. 5*

WORKLOAD MANAGEMENT AMONG CANDIDATE DISTRIBUTED COMPUTING ENVIRONMENTS BASED ON GOVERNANCE POLICIES

TECHNICAL FIELD

The present disclosure relates generally to distributed computing environments, and more specifically to management of a workload, such as a workload within distributed computing environments.

BACKGROUND

Cloud computing has become an essential part of modern businesses, providing on-demand computing resources and cost-effective solutions. Cloud computing may include providing computing services, such as software, storage, and processing power, that are accessible over the internet. Rather than relying on a local server or personal computer, users may access these resources from remote servers maintained by a third-party provider. This allows for greater flexibility, scalability, and cost savings, as users may adjust their usage and pay only for what they need. However, the increasing demand for cloud computing has resulted in a significant increase in energy consumption and carbon emissions.

The energy consumed by data centers and cloud computing is a significant contributor to global greenhouse gas emissions. Existing solutions for energy-efficient computing primarily focus on energy efficiency improvements and cost reduction. For example, such systems may use techniques such as virtualization, consolidation, and workload management to optimize resource allocation and reduce energy consumption. However, such systems may not typically consider the real-time carbon intensity of the power grids and lack integration of external factors with internal factors. Such systems also lack integration of external factors with internal factors, such as regulatory requirements and governance policies. Furthermore, batch interdependencies need to be considered while shifting or changing the timing of batch jobs, which is not well-addressed in existing solutions. In particular, batch jobs often have complex interdependencies and may require specific timing and sequencing to ensure that they complete successfully. Existing systems may not consider these interdependencies when optimizing compute workloads, which may result in suboptimal performance and increased energy consumption.

SUMMARY

The present disclosure presents new and innovative systems and methods for workload management, such as workload management for scheduling to reduce carbon emissions and comply with governance policies. To illustrate, a system, such as a computing device, configured for workload management may identify a set of candidate execution environments for processing of a workload. For example, the computing device may identify a set of candidate execution environments for processing of a workload. In certain implementations, the set of candidate execution environments may be identified based on a governance policy associated with the workload. The computing device may determine allowed locations based on corresponding governance controls, which may be identified based on scheduling entities and provisioning entities identified within a plurality of governance control documents. The computing device may generate recommendation information for processing the workload based on carbon intensity values associated with each candidate execution environment. In certain implementations, the workload may include a batch job.

The computing device may generate recommendation information for processing of the workload. For example, the computing device may generate recommendation information for processing of the workload. The recommendation information may be associated with a first execution environment selected from a set of candidate execution environments. The selection may be based on execution information that indicates a carbon intensity value associated with each candidate execution environment. The execution information may indicate a predicted carbon intensity value for the candidate execution environments, transfer energy costs associated with transferring the workload to the candidate execution environments, a carbon intensity average value for executing the workload with the candidate execution environments, or a combination thereof. The computing device may select the first execution environment from the set of candidate execution environments based on the execution information. The selection may be based on scheduling information associated with the set of candidate execution environments, historic workload scheduling data, or a combination thereof. In certain implementations, for each candidate execution environment of the set of candidate execution environments, determining the execution information associated with the candidate execution environment may include determining the carbon intensity average value for each time of multiple processing start times. The recommendation information may be generated based on multiple workloads that include the workload, the set of candidate execution environments, scheduling information associated with each candidate execution environment of the set of candidate execution environments, a cost threshold or an energy efficiency threshold, a weather prediction, or a combination thereof.

The computing device may generate or output a first indicator that indicates the recommendation information. For example, the computing device may output a first indicator that indicates the recommendation information. In certain implementations, the computing device may receive a second indicator that confirms the first execution environment may be acceptable for processing the workload. Based on the confirmation, the computing device may generate a schedule to indicate when the workload should be processed at the first execution environment. In certain implementations, based on the schedule, the computing device may transfer the workload to the first execution environment for execution at the designated time (such as by transferring the workload from a storage location to the first execution environment).

Such systems may offer several benefits to organizations that process workloads in cloud computing environments. By identifying a set of candidate execution environments and generating recommendation information based on carbon intensity values and other execution information, the system may enable organizations to make informed decisions about where to process their workloads. This may help organizations reduce their carbon footprint and energy costs, while also potentially improving the performance and reliability of their workloads. Additionally, or alternatively, the system may provide scheduling information and other controls to ensure that workloads are executed in compliance with governance policies and other requirements. Overall, the system provides a valuable tool for organizations to optimize their workload processing in cloud computing environments.

In a particular aspect, a method for workload management is performed by one or more processors. The method includes identifying a set of candidate execution environments for processing of a workload. The method also includes generating recommendation information for processing of the workload. The recommendation information is associated with a first execution environment selected from the set of candidate execution environments based on execution information that indicates, for each candidate execution environment of the set of candidate execution environments, a carbon intensity value associated with the candidate execution environment. The method further includes outputting a first indicator that indicates the recommendation information.

In a particular aspect, a system for workload management includes a memory and one or more processors communicatively coupled to the memory. The one or more processors is configured to identify a set of candidate execution environments for processing of a workload. The one or more processors is also configured to generate recommendation information for processing of the workload. The recommendation information is associated with a first execution environment selected from the set of candidate execution environments based on execution information that indicates, for each candidate execution environment of the set of candidate execution environments, a carbon intensity value associated with the candidate execution environment. The one or more processors is further configured to output a first indicator that indicates the recommendation information.

In another particular aspect, a non-transitory computer-readable storage medium storing instructions that, when executed by one or more processors, cause the one or more processors to perform operations for workload management. The operations include identifying a set of candidate execution environments for processing of a workload. The operations also include generating recommendation information for processing of the workload. The recommendation information is associated with a first execution environment selected from the set of candidate execution environments based on execution information that indicates, for each candidate execution environment of the set of candidate execution environments, a carbon intensity value associated with the candidate execution environment. The operations further include outputting a first indicator that indicates the recommendation information.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 1 is a block diagram of an example of a system that supports workload management according to one or more aspects;

FIG. 5 is a flow diagram of an example of a method for workload management according to one or more aspects.

Figure 2:
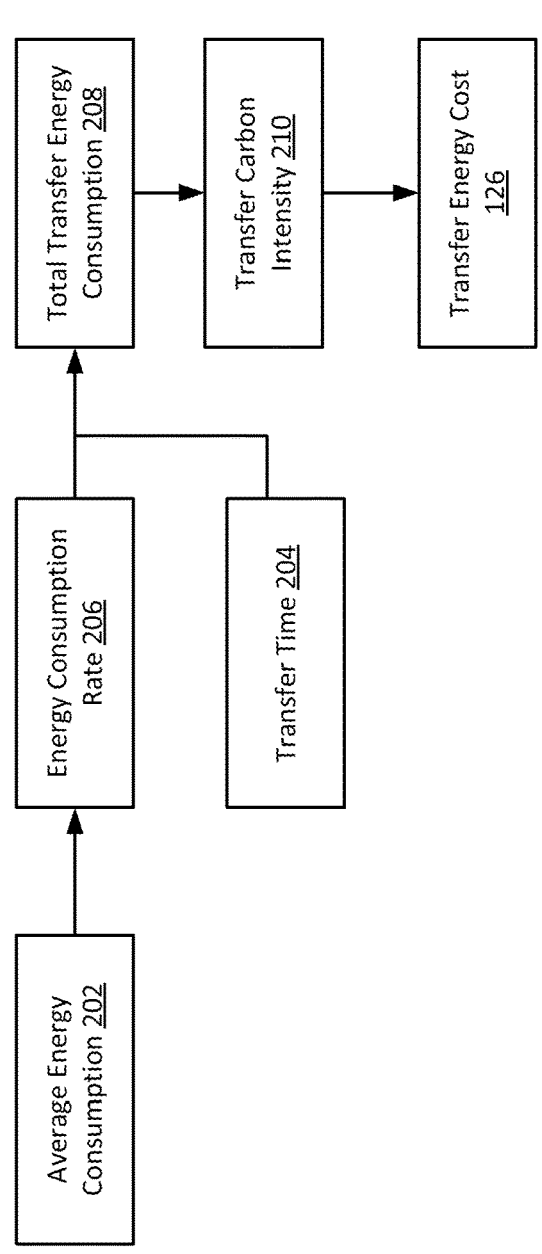
FIG. 2 shows an example of a process to calculate transfer energy costs according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support workload management, such as management of a cloud-based workload. Techniques for management of a cloud-based workload described herein provide improved workload scheduling by identifying and recommending cloud computing environments based on governance policies and carbon intensity values. Techniques for generating recommendation information for a workload include identifying a set of candidate execution environments and corresponding governance controls, analyzing execution information, scheduling information, and historic workload scheduling data, and determining measures such as data transfer measures and batch execution measures for each allowed location. Based on these measures, a first indicator may be output that indicates a recommended execution environment. A schedule may also be generated that considers timing, cost, and latency requirements while minimizing predicted carbon emissions. The workload may be transferred (such as automatically transferred, transferred after approval) to the recommended execution environment for processing. The use of real-time carbon systems and governance policy systems in recommending cloud computing environments allows for more efficient optimization of cloud-based workloads while reducing carbon emissions.

In some implementations, a system may be configured to determine workload scheduling recommendations in ways that reduce or resolve one or more of the issues discussed above. The system may be configured to integrate with real-time carbon systems and governance policy systems to determine recommendations, such as schedules, for cloud-based workloads. For example, the system may select and recommend particular cloud computing environments for particular workloads based on corresponding governance policies for the workloads and carbon intensity values for the cloud computing environments. The computing device may identify a set of candidate execution environments for one or more received workloads and may corresponding governance controls for the workload. The system may include a recommendation engine configured to determine recommendation information for the workloads. The recommendation information may identify corresponding execution environments for the workloads. For example, the recommendation information may identify a schedule for the workloads. The recommendation information may be generated based on execution information, scheduling information, and historic workload scheduling data. Measures such as data transfer measures and batch execution measures may be determined for candidate execution environments. The recommendation information may also be determined to account for timing, cost, and latency requirements while minimizing predicted carbon emissions. A first indicator may be included within the recommendation that identifies a recommended execution environment for a workload. The system may transfer workloads (such as automatically transfer workloads) to recommended execution environments for processing.

Figure 1:
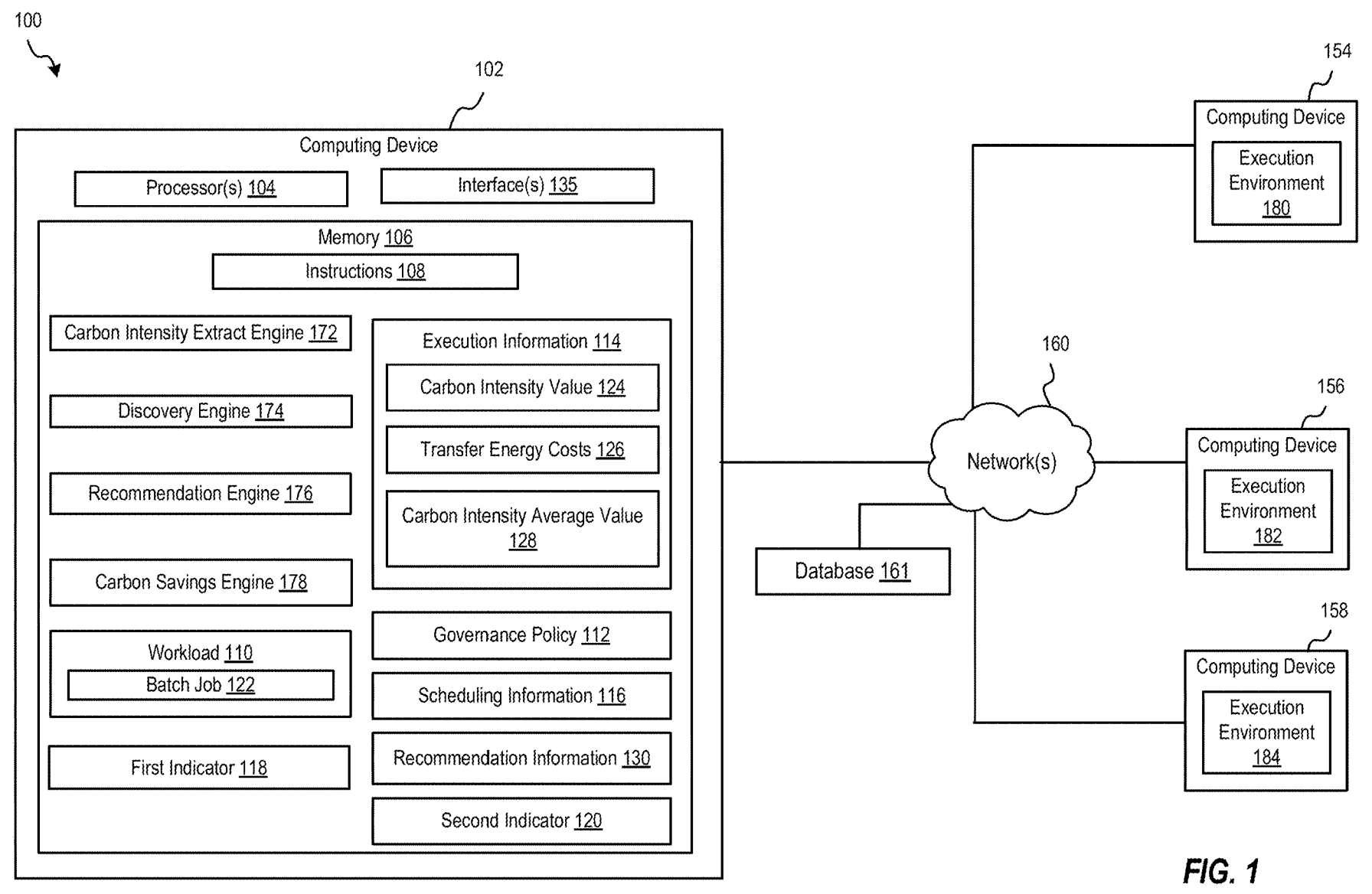

Referring to FIG. 1, an example of a system that supports workload management according to one or more aspects is shown as a system 100. As shown in FIG. 1, the system 100 includes a computing device 102, one or more networks 160, a computing device 154, a computing device 156, a computing device 158, and a database 161. In some implementations, the system 100 may include additional components that are not shown in FIG. 1, such as one or more client devices, additional databases or data sources, or a combination thereof, as non-limiting examples.

The computing device 102 may be configured to support one or more workload management operations. The computing device 102 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. In some implementations, the computing device 152 may be implemented by one or more personal or enterprise computing devices. In certain implementations, the computing device 152 may be implemented as part of the distributed computing environment, such as the same distributed computing environment as the computing devices 144, 156, 158. For example, in certain implementations, the computing device 152 may be configured to schedule workloads for execution within execution environments 180, 182, 184 of the distributed computing environment (such as execution environments 180, 182, 184 implemented by the computing devices 154, 156, 158).

The computing device 102 includes one or more processors 104, a memory 106, one or more communication interfaces 135. In some other implementations, one or more of the components may be optional, one or more additional components may be included in the computing device 102, or both. It is noted that functionalities described with reference to the computing device 102 are provided for purposes of illustration, rather than by way of limitation, and that the exemplary functionalities described herein may be provided via other types of computing resource deployments. For example, in some implementations, computing resources and functionality described in connection with the computing device 102 may be provided in a distributed system using multiple servers or other computing devices, or in a cloud-based system using computing resources and functionality provided by a cloud-based environment that is accessible over a network, such as the one of the one or more networks 160. To illustrate, one or more operations described herein with reference to the computing device 102 may be performed by one or more servers or a cloud-based system that communicates with one or more client, such as the computing device 154, the computing device 156, or the computing device 158.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 102 may be stored in the memory 106 as instructions 108 that, when executed by the one or more processors 104, cause the one or more processors 104 to perform the operations described herein with respect to the computing device 102, as described in more detail below.

The memory 106 may be configured to store one or more engines. The one or more engines may include a carbon intensity extract engine 172, a discovery engine 174, a recommendation engine 176, a carbon savings engine 178, or a combination thereof. Although the computing device 102 is described as including each of the carbon intensity extract engine 172, the discovery engine 174, the recommendation engine 176, the carbon savings engine 178, in other implementations, one or more of the carbon intensity extract engine 172, the discovery engine 174, the recommendation engine 176, the carbon savings engine 178 may be optional and/or may not be included in computing device 102.

The carbon intensity extract engine 172 may be configured to integrate governance controls and identify allowed locations for the workloads (such as allowed computing environments, allowed execution environments, and the like). As explained further below, the carbon intensity extract engine 172 may identify or otherwise determine execution information for one or more workloads, such as carbon intensity values, transfer energy costs, and carbon intensity average values for executing a workload at one or more of the identified locations.

The discovery engine 174 may be configured to identify workloads for execution, workload dependencies, scheduling information, and governance policies. For example, the discovery engine 174 may be configured to identify batch jobs for execution (such as batch jobs that are regularly executed) along with corresponding dependencies (such as prerequisite or otherwise required computing services necessary to complete execution of the batch jobs). The discovery engine 174 may also identify scheduling information for the batch jobs, such as times at which batch jobs need to execute, times at which execution of batch jobs needs to be completed, times during which batch jobs cannot be executed, and the like. In certain implementations, the discovery engine 174 may be configured to determine an application landscape (such as an application landscape for a particular entity, user, department, and the like). The application landscape may include batch job information as described above, interdependencies as described above, data volume for the batch jobs (such as amount of data received and transmitted), required code baselines, and required infrastructure. Discovery may further include identifying one or more corresponding data sovereignty rules, applicable policies, and preferred locations. In certain implementations, the discovery engine 174 may identify the above information using questionnaires, such as questionnaires to one or more associated personnel, administrators, developers, and the like. In additional or alternative implementations, one or more tools may be used to identify corresponding policies, such as one or more document searching tools, text searching tools, natural language searching tools, metadata analysis tools, and data synthesis tools to identify corresponding information such as the information discussed above.

The recommendation engine 176 may be configured to identify one or more recommendations for executing workloads (such as workloads identified by the discovery engine 174, workloads received from one or more users or other computing processes, and the like). In certain implementations, the recommendation engine 176 may identify a corresponding execution environment for each of a plurality of workloads. In certain implementations, the recommendation engine 176 may further identify one or more execution times within the identified execution environment. In certain implementations, the recommendation engine 176 may generate multiple corresponding execution environments for one or more workloads. The recommendation engine 176 may be configured to utilize one or more rule engines that determine a carbon-optimized scheduling time to meet the requirements identified by the discovery engine 174 for particular workloads and to minimize the overall carbon output from executing the workloads (such as based on information determined or otherwise identified by the carbon intensity extract engine 172). The recommendation engine 176 may consider historical information, such as workloads with previously-approved scheduling times and regions based on historical approval information (by users, supervising computing processes, and the like). In certain implementations, the recommendation engine 176 may recommend permanent shifting of workload schedules (such as for regularly repeating workloads). In certain implementations, as discussed further below, the recommendation engine 176 maintains a master schedule for repeating workloads and may update that schedule on a regular basis (such as a weekly basis, a daily basis). The carbon savings engine 178 may be configured to receive recommendations from the recommendation engine 176 and to determine absolute carbon savings (savings relative to a predetermined baseline, savings relative to a current configuration) if the recommended execution environment is used.

In certain implementations, the recommendation engine 176 may be further configured to automatically implement recommendations from the recommendation engine 176. In certain implementations, the recommendations may be automatically implemented upon receiving approval from a user or a supervising computer process. In additional or alternative implementations, the recommendations may be automatically implemented without receiving such approval. Automatic implementation of the recommendations may include workload and scheduling updates (such as temporarily updating, permanently updating). Automatically implementing recommendations may further include cloud provisioning, such as by provisioning and transferring workloads if a workload is shifted from one region (such as one cloud computing facility) to another. Automatic implementation of the recommendations may additionally or alternatively include automated workload execution at scheduled times, such as scheduled times, and within one or more recommended execution environments.

The carbon savings engine 178 may be configured to receive recommendations from the recommendation engine 176 and to determine absolute carbon savings (savings relative to a predetermined baseline, savings relative to a current configuration) if the recommended execution environment is used.

Additionally, the memory 106 may be configured to store data and information. For example, the memory 106 may store or indicate execution information 114, a workload 110, a governance policy 112, scheduling information 116, a first indicator 118, and a second indicator 120.

The workload 110 includes a batch job 122. A batch job 122 may include a computing process that runs without user interaction, such as scheduled to run at a specific time or triggered by a specific event. In cloud computing environments or other execution environments, batch jobs 122 may be used to perform various tasks, such as processing datasets, running simulations, sending communications, and the like. Batch jobs 122 may be managed and scheduled using a variety of tools and frameworks, such as Kubernetes, Apache Hadoop, Apache Spark, and the like.

In certain implementations, the computing device 102 may receive a governance policy 112 related to the workload 110. The governance policy 112 may be used to identify a set of candidate execution environments 180, 182, 184, which may include multiple cloud computing environments or a combination thereof. The computing device 102 may identify corresponding governance controls for the workload 110 and may determine allowed locations for the workload 110 based on the governance controls. The set of candidate execution environments 180, 182, 184 may be identified as execution environments that are located in the allowed locations. To identify the controls, the computing device 102 may determine scheduling entities and provisioning entities from within a plurality of governance control documents and may match the entities from the documents with corresponding entities associated with the workload 110. In certain implementations, scheduling entities may include software components or other mechanisms for scheduling and managing computing resources in an execution environment. Scheduling entities may be responsible for allocating resources to different users and workloads. In certain implementations, scheduling entities may be identified within governance policies and may include one or more requirements (such as scheduling deadlines or timing requirements) for corresponding workloads 110. Examples of scheduling entities may include job schedulers, workload managers, and resource managers. Provisioning entities may include software components or other mechanisms for provisioning and managing the physical infrastructure (such as physical computing resources) for an execution environment. For example, scheduling entities may be responsible for provisioning and managing servers, storage devices, and other hardware resources that are needed to support the execution environment. In certain implementations, provisioning entities may be identified within governance policies and may include one or more requirements (such as minimum resource requirements) for corresponding workloads 110.

Examples of provisioning entities may include virtualization managers, storage managers, and network managers.

The execution information 114 includes a carbon intensity value 124, transfer energy costs 126, and a carbon intensity average value 128. In certain implementations, the execution information 114 may indicate a predicted carbon intensity value 124 for the execution environments, transfer energy costs 126 for the execution environments, carbon intensity average values 128 for the execution environments, or combinations thereof. The carbon intensity value 124 may indicate a predicted total carbon intensity for executing the workload 110 within a corresponding execution environment. The transfer energy costs 126 may indicate predicted energy usage to transfer the workload 110 to the corresponding execution environment for execution. The carbon intensity average value 128 may indicate an expected average carbon intensity during execution of the workload 110 within the corresponding execution environment. In certain implementations, the carbon intensity value 124 may be determined based on the transfer energy costs 126 and the carbon intensity average value 128, such as by combining the transfer energy costs 126 for an execution environment with carbon intensity average value 128 for the execution environment.

In certain implementations, the computing device 102 determine a transfer energy cost 126 by determining the average energy consumption required to execute the workload 110 at each of the candidate execution environments 180, 182, 184. The computing device 102 may also determine the duration of data transfer for the workload 110. For example, the computing device 102 may consider different combinations of two or more candidate execution environments 180, 182, 184 (such as candidate execution environments 180, 182, 184 used to execute the workload 110 at different times). In additional or alternative implementations, computing device 102 may consider different combinations of transferring data between a current storage location for the workload 110 and the candidate execution environments 180, 182, 184. Based on transfer durations, the computing device 102 may calculate first measures of carbon intensity for executing the workload 110 during data transfer at each candidate execution environment 180, 182, 184. The computing device 102 may then determine second measures of carbon intensity for energy consumption by data centers on a data transfer network path between two or more candidate execution environments 180, 182, 184. The computing device 102 may then calculate overall data transfer energy cost 126 based on both the first and second measures of carbon intensity (such as by adding the first and second measures together).

The scheduling information 116 may indicate information regarding execution times for the workload 110, other workloads, or combinations thereof. In certain implementations, the scheduling information 116 may indicate execution times and corresponding execution environments 180, 182, 184 for one or more workloads 110. In additional or alternative implementations, the scheduling information 116 may contain information regarding the execution environments 180, 182, 184. For example, the scheduling information 116 may include availability times, pricing schedules, maintenance windows, and the like for one or more of the execution environments 180, 182, 184.

The first indicator 118 may contain information regarding a recommendation for the workload 110. For example, the first indicator 118 may contain recommendation information 130 determined by the computing device 102. In certain implementations, the recommendation information 130 may be associated with a first execution environment 180 selected from a set of candidate execution environments 180, 182, 184. For example, the recommendation information 130 may indicate that the first execution environment 180 should be used to execute all or part of the workload 110. In certain implementations, the recommendation information 130 may additionally or alternatively recommend a particular time at which the workload 110 should be executed within the first execution environment 180. The computing device 102 may be configured to determine recommendations for distributed workloads within candidate execution environments to reduce the environmental impacts of executing the workloads, to comply with governance policies, or combinations thereof. For example, the computing device 102 may be configured to generate recommendation information 130 for processing of the workload 110.

The second indicator 120 may be received from another computing device. For example, the second indicator 120 may be received in response to a user's actions on another computing device. In certain implementations, the second indicator 120 may indicate user feedback (such as metadata or an indication of user feedback) regarding the recommendation information 130. For example, the second indicator 120 may include approval or denial of all or part of the recommendation information 130, such as an approval of using the first execution environment 180 to execute the workload 110. In one particular implementation, the second indicator 120 may contain an identifier of the workload 110, the recommendation information 130, and an approval indicator (such as a Boolean true value) corresponding to the workload 110 and the recommendation information 130.

The one or more communication interfaces 135 may be configured to communicatively couple the computing device 102 to the one or more networks 136 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the computing device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to a display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 102. In some other implementations, the computing device 102 is communicatively coupled to one or more client devices that include or are coupled to respective display devices.

The one or more networks 160, such as a communication network, may facilitate communication of data between the computing device 102 and other components, servers/processors, and/or devices. For example, the one or more networks 160 may also facilitate communication of data between computing device 102 and computing device 154, computing device 156, computing device 185, database 161, or any combination therefore. The one or more networks 160 may include a wired network, a wireless network, or a combination thereof. For example, the one or more networks 136 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

The computing devices 154, 156, 158 may be one or more computing devices associated with users or individuals. For example, the computing devices 154, 156, 158 may be implemented by one or more of a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. In additional or alternative implementations, the computing devices 154, 156, 158 may be implemented by one or more enterprise computing devices, such as server computing devices, cloud computing devices, virtualized computing devices, and the like. In some implementations, each computing device 154, 156, 158 may include one or more components as described with reference to computing device 102, may be configured one or more operations as described with reference to computing device 102, or a combination thereof.

The computing devices 154, 156, 158 may implement one or more distributed computing environments. Distributed computing environments may include computing environments that are configured to provide on-demand computing services to one or more users. For example, distributed computing environments may include one or more publicly accessible computing environments available to provide computing services to one or more public users. In certain implementations, distributed computing environments may include cloud computing environments, virtualized computing environments, bare-metal computing environments, and the like. In certain implementations, the distributed computing environments may be implemented by one or more computing devices, such as one or more server computing devices. The computing devices may be located in the same location as one another (such as in the same building, the same server rack, and the like). Additionally, or alternatively, the computing devices may be located in different locations (such as within different buildings, in different geographical locations, and the like). To provide computing services, the distributed computing environments may allocate computing resources (such as processing resources, memory resources, storage resources, graphics processing resources, network resources, and the like) to received workloads for execution. In certain implementations, computing resources may be allocated to multiple workloads at the same time (such as within a virtualized computing environment). In additional or alternative implementations, computing resources may be allocated to a single workload at a time (such as within bare-metal computing environments). In certain implementations, multiple computing devices (such as multiple devices in the same location, different locations, or combinations thereof) may be used to provide computing services to a user at the same time (such as for the same workload). In certain implementations, received workloads may contain one or more software processes for execution (such as batch jobs, API requests, software services and similar processes). In particular, the distributed computing environments may include one or more execution environments 180, 182, 184 configured to execute received workloads. In certain implementations, the execution environments 180, 182, 184 may be implemented by one or more of the computing devices 144, 156, 158. For example, the execution environments 180, 182, 184 may be allocated computing resources as described above. In certain implementations, one or more execution environments within the distributed computing environment may be implemented by multiple computing devices (such as two or more of the computing devices 154, 156, 158).

The database 161 may include one or more databases, or other storage devices, configured to maintain and provide access to stored data. In some implementations, the database 161 may include a processor and a memory that stores instructions that, when executed by the processor, cause the processors to perform the operations described herein. The database 161 may be configured to store data (e.g., information), such as a knowledge corpus containing information such as historical batch job schedules, historical batch job configurations, historical batch job scheduling approval information, governance policies, available regions for a distributed computing environment, power grid information for a distributed computing environment, carbon footprint calculations for a distributed computing environment, cost information for a distributed computing environment, and the like. Although information is described as being stored at database 161, in other implementations, data stored the database 161 may additionally or alternatively be stored at a computing device, such as the computing device 102— e.g., at the memory 106 of the computing device 102.

During operation, the computing device 102 may perform one or more operations associated with workload management. For example, the computing device 102 may be configured to identify a set of candidate execution environments 180, 182, 184 for processing of a workload 110. A first execution environment 180 may be selected based on execution information 114 for the set of candidate execution environments 180, 182, 184. For example, the computing device 102 may determine execution information 114 for a set of candidate execution environments 180, 182, 184, such as for each execution environment of at least a subset of the set of candidate execution environments 180, 182, 184. Execution information 114 may include carbon intensity values 124, transfer energy costs 126, carbon intensity average values, or combinations thereof. The computing device 102 may then use the execution information 114 to select at least one first execution environment 180 for the workload 110. The computing device 102 may determine recommendation information 130 based on the at least one first execution environment. For example, the recommendation information 130 may identify the at least one execution environment to execute the workload 110 and may identify a time at which the workload 110 should be executed. The computing device 102 may be configured to output a first indicator 118 that indicates the recommendation information 130. The first indicator 118 may be output as a message, notification, or other indication that includes all or part of the recommendation information 130. In certain implementations, approval may be received (such as from a user) in response to the first indicator 118. The computing device 102 may be further configured to transfer the workload 110 between one or more execution environments based on the schedule. Certain implementations of these operations are described in greater detail below.

In particular, the computing device 102 may be configured to identify a set of candidate execution environments 180, 182, 184 for processing of a workload 110. The set of candidate execution environments 180, 182, 184 may include multiple cloud computing environments or a combination thereof. The candidate execution environments 180, 182, 184 may be implemented by one or more computing device 154, 156, 158. For example, the set of candidate execution environments 180, 182, 184 may include one or more on-premises data centers, public clouds, private clouds, hybrid clouds, edge computing environments, and/or other distributed computing environments.

In certain implementations, a governance policy 112 may be used to determine the set of candidate execution environments 180, 182, 184. For example, the computing device 102 may receive or otherwise identify a governance policy 112 related to the workload 110. The computing device 102 may then identify allowed locations based on the governance policy 112 and may identify the set of candidate execution environments 180, 182, 184 based on the allowed locations. In some implementation, to identify governance policies, a model, such as a Named Entity Recognition (NER) model, can be trained on a corpus of governance policies to identify entities, such as scheduling entities and provisioning entities. The training process may include tokenization, lemmatization, labelisation, and model fitting. Once the model is trained, the model may be used to extract the scheduling entities and provisioning entities from governance policies. Scheduling entities may include data classification, app/data sovereignty requirements, service level agreements, business critical processes, allowed execution regions, maximum allowed latency, cost thresholds. Provisioning entities may include the provisioning process and approvals needed (such as users who need to approve particular workload assignments); patching schedules of operating systems, applications, and firmware used to execute workloads; multi-factor authentication requirements, hardware asset registers, information asset registers, logging and log retention requirements, and incident response plans requirements. By attaching the extracted entities with a list of batches that contain details like region, scheduling time, etc., governance policies can be identified and analyzed for compliance and risk management.

In certain implementations, additional considerations may be used to identify the set of candidate execution environments 180, 182, 184. For example, the computing device 102 may identify a set of candidate execution environments 180, 182, 184 for processing a workload 110 by analyzing various factors such as availability, cost, performance, user preferences, or a combination thereof.

The first execution environment 180 may be selected based on execution information 114 for the set of candidate execution environments 180, 182, 184. For example, the computing device 102 may determine execution information 114 for a set of candidate execution environments 180, 182, 184, such as for each execution environment of at least a subset of the set of candidate execution environment 180, 182, 184. The computing device 102 may then use the execution information 114 to select at least one first execution environment 180 for the workload 110.

Referring to FIG. 2, FIG. 2 shows an operation 200 to calculate transfer energy costs according to an aspect of the present disclosure. In particular, the operation 200 may be performed by the computing device 102 to determine the transfer energy costs 126. In the operation 200, the computing device 102 may calculate an average energy consumption 202 of different services used in the batch processes during execution. For example, certain execution environments may provide carbon footprint calculators or similar application programming interfaces (APIs) that can be used to determine average energy consumption for processed used by a workload (such as by particular batch jobs within the workload). Based on the data volume for the workload, distance between locations, and network bandwidth between locations, the computing device 102 may determine a transfer time 204 reflecting a one-way time required to complete data transfer for the workload 110 between the identified locations. The computing device 102 may determine an energy consumption rate 206 for the transfer. A total transfer energy consumption 208 may then be determined based on the energy consumption rate 206 and a total data volume for the workload 110. The computing device 102 may determine a transfer carbon intensity 210 during the data transfer. The transfer carbon intensity 210 may be determined based on real-time carbon intensity information for data centers on the network path, which may be used to perform the actual data transfers between the selected locations. A carbon intensity of one or more data centers may be determined based on average MOER (Marginal Operating Emissions Rate) values of power grids for the one or more data centers on the network path for the data transfer. The computing device 102 may determine the total carbon emission during data transfer (such as for round trip transfer) based on the total transfer energy consumption 208 and the transfer carbon intensity 210 as the transfer energy costs 126.

Returning to FIG. 1, in certain implementations, to determine the carbon intensity average value 128, the computing device 102 may determine energy usage measures for executing the respective workload 110 at the candidate execution environments 180, 182, 184. The energy usage may be determined based on power usage effectiveness (PUE) values for the candidate execution environments 180, 182, 184. Additionally, the computing device 102 may determine carbon intensity forecasts for the candidate execution environments 180, 182, 184. Based on the energy usage measures and carbon intensity forecasts, the computing device 102 may determine the carbon intensity average value 128. In certain implementations, multiple measures for certain locations may be included, such as energy use values for certain locations at different times of day.

Figure 3:
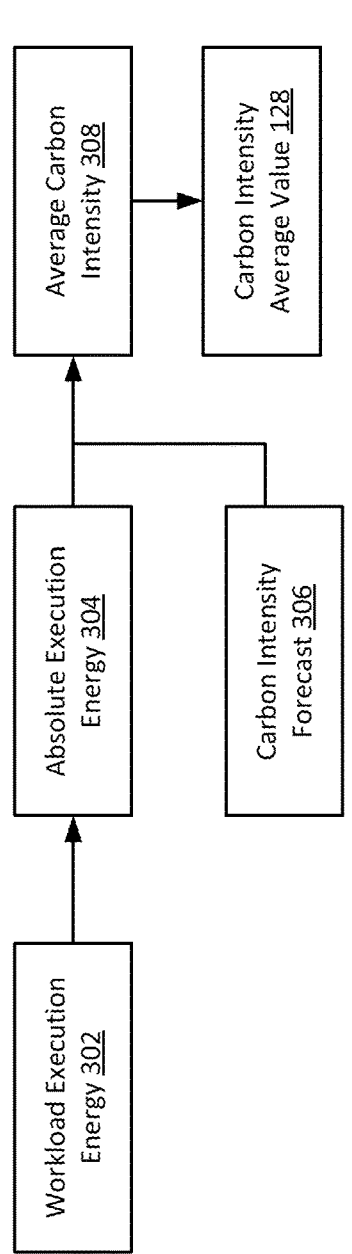
FIG. 3 shows an example of a process to calculate carbon intensity average values according to one or more aspects.

Referring to FIG. 3, FIG. 3 shows an operation 300 to calculate carbon intensity average values according to an aspect of the present disclosure. In particular, the operation 300 may be performed by the computing device 102 to determine the carbon intensity average value 128. The computing device 102 may determine a workload execution energy 302, which may measure energy usage by the computing hardware used to execute the workload 110. The workload execution energy 302 may be determined similar to the average energy consumption 202, such as based on a carbon footprint calculator or API that analyzes one or more services utilized by the workload 110. The computing device 102 may determine an absolute execution energy 304 for the workload 110, such as to include operating inefficiencies for the candidate execution environments 180, 182, 184. For example, absolute execution energy 304 may be determined by multiplying the workload execution energy 302 by PUE values for the candidate execution environments 180, 182, 184 (which may be received from a database 161 or API, such as the WattTime® API). The computing device 102 may determine a carbon intensity forecast 306 to include expected carbon intensity for energy utilized by the candidate execution environments. Carbon intensity for locations may vary over time for locations, as various energy sources provide more or less energy (such as based on changing times of day or weather for solar or wind energy). The carbon intensity forecast 306 may be determined to account for these changes. In certain implementations, the carbon intensity forecast 306 may be received from a database 161 or API, such as the WattTime® API). An average carbon intensity 308 may be determined for the workload 110, such as based on an execution time for the workload 110 and the carbon intensity forecast 306. The computing device 102 may determine the carbon intensity average value 128 based on the absolute execution energy 304 and the average carbon intensity 308, such as by multiplying the absolute execution energy 304 and the average carbon intensity 308.

Returning back to FIG. 1, the computing device 102 may select the first execution environment from the set of candidate execution environments 180, 182, 184 based on the execution information 114. The selection may be based on scheduling information 116 associated with the set of candidate execution environments 180, 182, 184, historic workload 110 scheduling data, or a combination thereof. In certain implementations, for each candidate execution environment of the set of candidate execution environments 180, 182, 184, determining the execution information 114 associated with the candidate execution environment may include determining the carbon intensity average value 128 for each time of multiple processing start times. For example, energy sources for certain execution environments may differ over the course of the day and may have different carbon intensities at those times of day. In such instances, different carbon intensity average values 128 may be determined at different times of day, and corresponding carbon intensity values 124 may similarly be determined for executing the workload 110 at different times of day.

The recommendation information 130 may be generated based on multiple workloads that include the workload 110. For example, the computing device 102 may determine a schedule to minimize the overall carbon intensity for multiple workloads that include the workload 110, based on the operating requirements of all of the multiple workloads. In additional or alternative implementations, the recommendation information 130 may be determined based on the set of candidate execution environments 180, 182, 184, such as based on carbon intensities, availability predictions, and the like for the candidate execution environments 180, 182, 184. In additional or alternative implementations, the recommendation information 130 may be determined based on scheduling information 116 associated with the set of candidate execution environments 180, 182, 184. For example, the scheduling information 116 may include availability times, pricing schedules, maintenance windows, and the like for one or more of the execution environments 180, 182, 184. In additional or alternative implementations, the recommendation information 130 may be determined based on a cost threshold or an energy efficiency threshold. For example, the workload 110 or associated governance documents may specify a cost threshold (such as a maximum cost), an energy efficiency threshold (such as a maximum energy usage, or a maximum carbon intensity), and the recommendation information 130 may be determined to comply with the identified requirements. In additional or alternative implementations, the recommendation information 130 may be determined based on a weather prediction (such as a weather prediction in one or more of the locations for the execution environments 180, 182, 184). For example, energy sources for particular locations may differ depending on the weather (such as based on increased/decreased availability of solar and wind energy sources). In such instances, the recommendation information 130 may be determined to minimize carbon intensity based on predicted changes to available energy sources based on the weather prediction. The recommendation information 130 may additionally or alternatively be determined based on information regarding one or more of the candidate execution environments, such as a carbon intensity value 124 of the candidate execution environment, an infrastructure cost of the candidate execution environment, a provisioning time of the candidate execution environment, a service level agreement or latency associated with the candidate execution environment, or a combination thereof.

In some implementations, the computing device 102 may determine the recommendation information 130 by determining a daily schedule for required workloads based on a master schedule and the operating requirements of current workloads. To determine the daily schedule, a rule-based recommendation engine may be used to provide batch-wise temporal shift recommendations (such as execution times), temporal shape recommendations (such as executing across multiple locations at different times), no action recommendations, or combinations thereof. The master schedule may be updated at regular intervals, such as weekly, and the updating process may involve using a model (such as a random forest classification model) to predict carbon intensity range for the next week and then determine temporal shift, temporal shape, or no action requirements based on the predictions for the next week. Rule-based pattern analysis may also be employed to identify workflows that are candidates for permanent shaping or shifting (such as on an ongoing basis and not just for the next week). The inputs for determining the recommendation may include factors such as infrastructure cost, provisioning time, energy efficiency threshold, energy efficiency tradeoff, business constraints (such as SLA and latency) at allowed locations, and weather predictions. The key recommendation factors may include batch job interdependencies consideration for timing change and compliance with SLAs with infrastructure provisioning time and data transfer latency. The recommendation information 130 may be determined to ensure that additional infrastructure costs are within the allowed maximum cost threshold while achieving energy efficiency greater than minimum energy efficiency threshold. Finally, recommendations may made to retain or decommission new infrastructure post-execution depending on compliance requirements.

The computing device 102 may be configured to output a first indicator 118 that indicates the recommendation information 130. The first indicator 118 may be output as a message, notification, or other indication that includes all or part of the recommendation information 130. In certain indications, the first indicator 118 may include a button or other mechanism to receive approval (such as from the user) for the recommendation information 130 (such as approval to execute the workload 110 using the first execution environment 180). In certain implementations, the computing device 102 may further receive a second indicator 120 that confirms the first execution environment may be acceptable for processing the workload 110. For example, a user may accept the recommendation information 130 included within the first indicator 118. Based on the confirmation, the computing device 102 may generate a schedule to indicate when the workload 110 should be processed at the first execution environment. In certain implementations, based on the schedule, the computing device 102 may transfer the workload 110 to the first execution environment 180 for execution at the designated time (such as by transferring the workload 110 from a storage location to the first execution environment 180). In particular, based on the execution information 114, the computing device 102 may determine a schedule as explained above that identifies times and selected cloud computing environments to execute the workloads 110. This schedule may be determined to comply with timing requirements for the workload 110 and minimize predicted carbon emissions caused by executing the workload 110.

The computing device 102 may accordingly be configured to transfer the workload 110 between one or more execution environments based on the schedule. For example, the computing device 102 may receive scheduling information 116 that indicates when a workload 110 may be scheduled for processing at a second execution environment. The computing device 102 may select the first execution environment from a set of candidate execution environments 180, 182, 184 and may transfer the workload 110 from the second execution environment to the first execution environment. The computing device 102 may then initiate processing of the workload 110 by the first execution environment.

In certain implementations, the computing device 102 may automatically and dynamically provision infrastructure provisioning based on governance controls. The dynamic provisioning may include an approval process if approval control is required for the application. The recipients of associated approval requests may be parameterized for the approval process. The dynamic provisioning may include a patching schedule process for on-premises processes to ensure that there is no scheduled downtime in execution environments for scheduled times. Based on governance controls and type of service provisioned, a multi-factor authentication challenge may be included. If corresponding governance policies mention maintaining hardware asset registers or information asset registers, a write to registers process may be automatically added for the dynamic provisioning process. In such instances, register location and type of details to be added to the register may controlled by config files for the workload, governance policy, dynamic provisioning process, or combinations thereof. A logging process may be added to the dynamic provisioning process if required as per governance control. Log detail levels, format of log files, and retention periods may be parameterized or controlled by configuration files for the workload, governance policy, dynamic provisioning process, or combinations thereof. Role-based access control policies on newly-provisioned data stores may be added for automatic enforcement by the dynamic provisioning process. Required incident response actions may be generated by the dynamic provisioning process, such as according to a roll-back plan. Based on a trigger, incident response actions such as cleaning up the provisioned infrastructure, deactivating all active users, killing all active connections, and the like may be executed according to requirements of the execution environments, the governance policies, or combinations thereof.

As described above, the system 100 supports workload management. The system 100 may offer several benefits to organizations that process workloads in cloud computing environments. By identifying a set of candidate execution environments and generating recommendation information based on carbon intensity values and other execution information, the system 100 may enable organizations to make informed decisions about where to process their workloads. This may help organizations reduce their carbon footprint and energy costs, while also potentially improving the performance and reliability of their workloads. Additionally, or alternatively, the system 100 may provide scheduling information and other controls to ensure that workloads are executed in compliance with governance policies and other requirements. Overall, the system 100 provide a valuable tool for organizations to optimize their workload processing in cloud computing environments.

Figure 4:
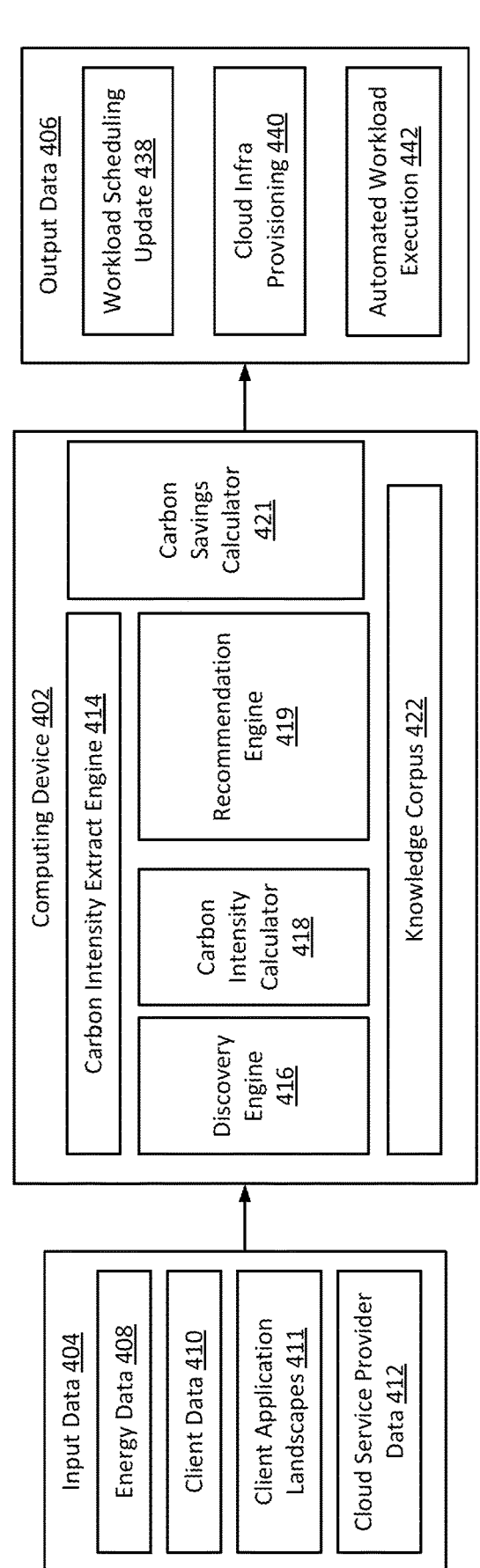
FIG. 4 is a block diagram of another example of a system that supports workload management according to one or more aspects.
Figure 4:

Referring to FIG. 4, FIG. 4 is a block diagram of another example of a system 400 that supports workload management according to one or more aspects. The system 400 may be an exemplary implementation of one or more of the systems discussed above. For example, the system 400 may be an exemplary implementation of the system 100 and may be implemented at least in part by the computing device 102.

System 400 includes a computing device 402. The computing device 402 may include or correspond to computing device 102. The computing device 402 may be configured to receive input data 404 about one or more execution environments and generate output data 406 about workloads for execution in the execution environments.

The input data 404 may include energy data 408, client data 410, client application landscapes 411, cloud service provider data 412, or combinations thereof. Energy data 408 may be accessed through an API, such as the WattTime® API, and reflect information about power usage, power grid energy sources, and energy pricing. Client data 410 may be determined based on information from the business or IT users and may identify batches, scheduling flexibility conditions, and dependencies. In some implementations, the batches may include or correspond to workload 110 or batch job 1122. Client application landscapes 411 may include tool-based discovery to identify data volume, required execution infrastructure, and governance policies. Cloud service provider data 412 may include infrastructure information for execution environments that may be used for batch execution.

The computing device 402 includes a carbon intensity extract engine 414, a discovery engine 416, a carbon intensity calculator 418, a recommendation engine 419, a carbon savings calculator 421, and a knowledge corpus 422. Carbon intensity extract engine 414 may include or correspond to carbon intensity extract engine 172. Discovery engine 416 may include or correspond to discovery engine 174. Recommendation engine 419 may include or correspond to recommendation engine 176. Carbon savings calculator 421 may include or correspond to Carbon savings engine 178.

The knowledge corpus 422 may contain information regarding workloads, execution environments, and the like. For example, the knowledge corpus 422 may contain batch job schedules, batch job configurations, governance policies, cloud service regions, cloud service power grids, cloud service carbon usage, cloud service costs, or combinations thereof. The workloads may include or correspond to workload 110.

In some implementations, the discovery engine 416 may be implemented as a questionnaire and tool-based client landscape discovery to identify batch jobs, dependencies, scheduling information, governance policies, or combinations thereof. The carbon intensity extract engine 414 may integrate governance controls to identify allowed locations and use energy data 408 to extract forecasted carbon intensity values for all allowed regions of a batch (such as a batch containing multiple workloads). The carbon intensity calculator 418 may determine data transfer energy usage and carbon intensity values for workloads based on the forecasted carbon intensity value. The carbon intensity values may be determined to consider scope 3 emissions (such as direct and indirect greenhouse gas emissions) as a result of executing workloads. The carbon intensity calculator 418 may additionally or alternatively determine a carbon intensity rolling average value for workloads, such as based on job duration, or combinations thereof.

The recommendation engine 419 may contain a rule engine that determines the carbon-optimized scheduling time and region in sync with governance policies and scheduling constraints. The carbon savings calculator 421 may receive recommendations from the recommendation engine 419 and may determine carbon savings (such as absolute carbon savings) based on the recommendations, such as if a recommended workload scheduling is implemented.

The computing device 402 may determine output data 406 for one or more workloads (such as one or more workloads identified within the client application landscapes 411). In certain implementations, the output data 406 may be generated in response to receiving approval from a user, such as a business user. The output data 406 may be generated that includes a workload scheduling update 438, cloud infra provisioning 440, automated workload execution 442, or combinations thereof. Workload scheduling updates 438 may include automated batch scheduling updates for workloads at one or more recommended times. Cloud infra provisioning 440 may include automated dynamic governance policy-driven infrastructure provisioning if the workload is shifted to a new region. Automated workload execution 442 may include automatically implementing workload execution at the scheduled time.

Referring to FIG. 5, FIG. 5 is a flow diagram of an example of a method 500 for workload management according to one or more aspects. In some implementations, the operations of the method 500 may be stored as instructions that, when executed by one or more processors (e.g., the one or more processors of a computing device or a server), cause the one or more processors to perform the operations of the method 500. In some implementations, the method 500 may be performed by a computing device, such as the computing device 102 of FIG. 1, the computing device 402 of FIG. 4, or combinations thereof.

The method 500 includes identifying a set of candidate execution environments for processing of a workload, at 502. For example, the set of candidate execution environments and the workload may include or correspond to the set of candidate execution environments 180, 182, 184 and the workload 110. In certain implementations, each the candidate execution environment of the set of candidate execution environments is a different cloud computing environment. In certain implementations, the set of candidate execution environments includes multiple candidate execution environments.

The method 500 may also include receiving a governance policy associated with the workload. In certain implementations, the set of candidate execution environments may be identified based on a governance policy associated with the workload, such as the governance policy 112. The method 500 may include determining allowed locations based on corresponding governance controls, which may be identified based on scheduling entities and provisioning entities identified within a plurality of governance control documents. The method 500 may include generating recommendation information, such as recommendation information 130, for processing the workload based on carbon intensity values associated with each candidate execution environment. For example, the carbon intensity values may include or correspond to the carbon intensity values 124. In certain implementations, the workload 110 may include a batch job 122.

The method 500 includes generating recommendation information for processing of the workload, at 504. For example, the recommendation information may include or correspond to the recommendation information 130. The recommendation information may be associated with a first execution environment selected from the set of candidate execution environments based on execution information that indicates, for each candidate execution environment of the set of candidate execution environments, a carbon intensity value associated with the candidate execution environment. The execution information and the carbon intensity value may include or correspond to the execution information 114 and the carbon intensity value 124, respectively.

The method 500 includes outputting a first indicator that indicates the recommendation information, at 506. For example, the first indicator may include or correspond to the first indicator 118.

In certain implementations, the method 500 includes determining the execution information for the set of candidate execution environments. In certain implementations, for each candidate execution environment of the set of candidate execution environments, the method 500 includes determining the execution information associated with the candidate execution environment. In certain implementations, the execution information associated with the candidate execution environment indicates a predicated carbon intensity value for the candidate execution environment, a transfer energy costs associated with transferring the workload to the candidate execution environment, a carbon intensity average value, or combinations thereof. The transfer energy cost and the carbon intensity average value may include or correspond to the transfer energy costs 126 and the carbon intensity average value 128, respectively. The transfer energy costs may be based on a location of the candidate execution environment, a distance between the first execution environment and the candidate execution environment, network information, or a combination thereof. The carbon intensity average value may be based on a duration associated with a duration of processing the workload at the candidate execution environment, a power usage effectiveness value of the candidate execution environment, or a combination thereof. In certain implementations, the method 500 further includes selecting, based on the execution information, the first execution environment from the set of candidate execution environments. The first execution environment may be further selected based on scheduling information associated with the set of candidate execution environments, historic workload scheduling data, or a combination thereof.

In some implementations, for each candidate execution environment of the set of candidate execution environments, determining the execution information associated with the candidate execution environment includes determining the carbon intensity average value for each time of multiple processing start times. In certain implementations, the recommendation information is generated based on multiple workloads that includes the workload, the set of candidate execution environments, scheduling information associated with each candidate execution environment of the set of candidate execution environments 180, 182, 184, a cost threshold or an energy efficiency threshold, a weather prediction, or a combination thereof. The scheduling information may include or correspond to the scheduling information 116. Additionally, or alternatively, the recommendation information may be generated based on, for each candidate execution environment of the set of candidate execution environments, the carbon intensity value of the candidate execution environment, an infrastructure cost of the candidate execution environment, a provisioning time of the candidate execution environment, a service level agreement or latency associated with the candidate execution environment, or a combination thereof.

In certain implementations, the method 500 includes receiving a second indicator that indicates an acceptance of the first execution environment for processing of the workload. For example, the second indicator may include or correspond to the second indicator 120. In certain implementations, the method 500 further includes, based on the second indicator, generating a schedule of the workload to indicate the processing of the workload at the first execution environment at a first time and transferring the workload from a storage location of the workload to the first execution environment. The schedule may include or correspond to scheduling information 116.

In certain implementations, the method 500 includes provisioning the first execution environment for the processing of the workload. Additionally, the method 500 may include initiating the processing of the workload by the first execution environment.

In certain implementations, the method 500 includes receiving scheduling information that indicates that the workload is scheduled for processing at a second execution environment at a second time. For example, the scheduling information may include or correspond to the scheduling information 116. The second execution environment may include or correspond to the second execution environment 182. The method 500 may also include selecting the first execution environment from the set of candidate execution environments. Additionally, or alternatively, the method 500 may include transferring or initiating transfer of the workload from the second execution environment to the first execution environment, initiating processing of the workload by the first execution environment, or a combination thereof.

The method 500 may be performed to determine recommendations for distributed workloads within candidate execution environments to reduce the environmental impacts of executing the workloads, to comply with governance policies, or combinations thereof. Additionally, or alternatively, the method 500 may provide organizations with a range of benefits when it comes to processing workloads in cloud computing environments. By considering carbon intensity values and other execution information, the method 500 enables the computing device to identify a set of candidate execution environments and generates recommendation information to help organizations make informed decisions about where to process their workloads. This approach may result in improved performance and reliability, as organizations may select the best execution environment for each workload based on factors such as latency, service level agreement, and infrastructure cost. Additionally, or alternatively, the method 500 enables the computing device to provide scheduling information and other controls to ensure that workloads are executed in compliance with governance policies and other requirements. By managing workload processing in this way, organizations may accordingly reduce their carbon footprint and energy costs while enhancing the overall performance and reliability of their systems.

It is noted that other types of devices and functionality may be provided according to aspects of the present disclosure and discussion of specific devices and functionality herein have been provided for purposes of illustration, rather than by way of limitation. It is noted that the operations of the method 500 of FIG. 5 may be performed in any order, or that operations of one method may be performed during performance of another method, such as one or more operations described with reference to the system 100 of FIG. 1, the method or operation 200 of FIG. 2, the method or operation 300 of FIG. 3, the system 400 of FIG. 4, or a combination thereof. It is also noted that one or more operations of the method of FIG. 5 may be combined with other operations, may be repeated, may be optional, or a combination thereof. It is also noted that the method 500 of FIG. 5 may also include other functionality or operations consistent with the description of the operations of FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, engines, and the modules described herein with respect to FIGS. 1-5 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for case of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for workload management performed by one or more processors, the method comprising:

training, by the one or more processors, a Named Entity Recognition (NER) model on a corpus of governance policies to identify entities including scheduling entities and provisioning entities, identifying, by the one or more processors, a governance policy associated with a workload within distributed computing environments, wherein the distributed computing environments include one or more computing devices in cloud computing environments, and wherein the distributed computing environment allocates computing resources to the workload for execution;

identifying, by the one or more processors based on the governance policy, a set of candidate execution environments for processing the workload;

identifying, by the one or more processors, allowed locations based on the governance policy and identifying the set of candidate execution environments based on the allowed locations, wherein the workload includes a batch job, the set of candidate execution environments, each candidate execution environment of the set of candidate execution environments is a different cloud computing environment, and the set of candidate execution environments includes multiple candidate execution environments;

generating, by the one or more processors, recommendation information for processing of the workload, the recommendation information associated with a first execution environment selected from the set of candidate execution environments based on execution information that indicates, for each candidate execution environment of the set of candidate execution environments, a carbon intensity value associated with the candidate execution environment;

outputting, by the one or more processors, a first indicator that indicates the recommendation information; and transferring, by the one or more processors, the workload from a storage location of the workload to the first execution environment.

2. The method of claim 1, further comprising:

determining the execution information for the set of candidate execution environments;

for each candidate execution environment of the set of candidate execution environments, determining the execution information associated with the candidate execution environment, the execution information associated with the candidate execution environment indicates:

a predicated carbon intensity value for the candidate execution environment, a transfer energy costs associated with transferring the workload to the candidate execution environment, the transfer energy cost based on a location of the candidate execution environment, a distance between the first execution environment and the candidate execution environment, network information, or a combination thereof;

a carbon intensity average value based on a duration associated with a duration of processing the workload at the candidate execution environment, a power usage effectiveness value of the candidate execution environment, or a combination thereof; or a combination thereof; and selecting, based on the execution information, the first execution environment from the set of candidate execution environments, the first execution environment further selected based on scheduling information associated with the set of candidate execution environments, historic workload scheduling data, or a combination thereof.

3. The method of claim 2, wherein:

for each candidate execution environment of the set of candidate execution environments, determining the execution information associated with the candidate execution environment includes determining the carbon intensity average value for each time of multiple processing start times; and the recommendation information is generated based on:

multiple workloads that includes the workload, the set of candidate execution environments, scheduling information associated with each candidate execution environment of the set of candidate execution environments, for each candidate execution environment of the set of candidate execution environments:

the carbon intensity value of the candidate execution environment, an infrastructure cost of the candidate execution environment, a provisioning time of the candidate execution environment, a service level agreement or latency associated with the candidate execution environment, or a combination thereof, a cost threshold or an energy efficiency threshold, a weather prediction, or a combination thereof.

4. The method of claim 1, further comprising:

receiving a second indicator that indicates an acceptance of the first execution environment for processing of the workload; and based on the second indicator:

generating a schedule of the workload to indicate the processing of the workload at the first execution environment at a first time.

5. The method of claim 4, further comprising:
provisioning the first execution environment for the processing of the workload; and
initiating the processing of the workload by the first execution environment.

6. The method of claim 1, further comprising:
receiving scheduling information that indicates that the workload that is scheduled for processing at a second execution environment at a second time;
selecting the first execution environment from the set of candidate execution environments;
transferring the workload from the second execution environment to the first execution environment; and
initiating processing of the workload by the first execution environment.

7. A system for workload management, the system comprising:
a memory; and
one or more processors communicatively coupled to the memory, the one or more processors configured to:
train a Named Entity Recognition (NER) model on a corpus of governance policies to identify entities including scheduling entities and provisioning entities,
identify a governance policy associated with a workload within distributed computing environments, wherein the distributed computing environments include one or more computing devices in cloud computing environments, and
wherein the distributed computing environment allocates computing resources to the workload for execution;
identify based on the governance policy, a set of candidate execution environments for processing the workload;
identify allowed locations based on the governance policy and identify the set of candidate execution environments based on the allowed locations,
wherein the workload includes a batch job, the set of candidate execution environments, each candidate execution environment of the set of candidate execution environments is a different cloud computing environment, and the set of candidate execution environments includes multiple candidate execution environments;
generate recommendation information for processing of the workload, the recommendation information associated with a first execution environment selected from the set of candidate execution environments based on execution information that indicates, for each candidate execution environment of the set of candidate execution environments, a carbon intensity value associated with the candidate execution environment;
output a first indicator that indicates the recommendation information; and
transfer the workload from a storage location of the workload to the first execution environment.

8. The system of claim 7, wherein the one or more processors configured to, for each candidate execution environment of the set of candidate execution environments, receive a predicated carbon intensity value for the candidate execution environment.

9. The system of claim 7, wherein the one or more processors configured to, for each candidate execution environment of the set of candidate execution environments, determine a transfer energy costs associated with transferring the workload to the candidate execution environment, the transfer energy cost based on a location of the candidate execution environment, a distance between the first execution environment and the candidate execution environment, network information, or a combination thereof.

10. The system of claim 7, wherein the one or more processors configured to, for each candidate execution environment of the set of candidate execution environments, determine a carbon intensity average value based on a duration associated with a duration of processing the workload at the candidate execution environment, a power usage effectiveness value of the candidate execution environment, or a combination thereof.

11. The system of claim 10, wherein, to determine the execution information for each candidate execution environment of the set of execution environments, the one or more processors is further configured to determine the carbon intensity average value for each time of multiple processing start times.

12. The system of claim 7, wherein the one or more processors configured to select, based on the execution information, the first execution environment from the set of candidate execution environments, the first execution environment further selected based on scheduling information associated with the set of candidate execution environments and historic workload scheduling data.

13. The system of claim 7, wherein the recommendation information is generated based on, for each candidate execution environment of the set of candidate execution environments:
the carbon intensity value of the candidate execution environment,
an infrastructure cost of the candidate execution environment,
a provisioning time of the candidate execution environment, and
a service level agreement or latency associated with the candidate execution environment.

14. A non-transitory computer-readable storage medium storing instructions that, when executed by one or more processors, cause the one or more processors to perform operations for application portfolio management, the operations comprising:
training a Named Entity Recognition (NER) model on a corpus of governance policies to identify entities including scheduling entities and provisioning entities,
identifying a governance policy associated with a workload within distributed computing environments, wherein the distributed computing environments include one or more computing devices in cloud computing environments, and
wherein the distributed computing environment allocates computing resources to the workload for execution;
identifying based on the governance policy, a set of candidate execution environments for processing the workload;
identifying allowed locations based on the governance policy and identifying the set of candidate execution environments based on the allowed locations,
wherein the workload includes a batch job, the set of candidate execution environments, each the candidate execution environment of the set of candidate execution environments is a different cloud comput-
ing environment, and the set of candidate execution
environments includes multiple candidate execution
environments;
generating recommendation information for processing of
the workload, the recommendation information associ-
ated with a first execution environment selected from
the set of candidate execution environments based on
execution information that indicates, for each candidate
execution environment of the set of candidate execu-
tion environments, a carbon intensity value associated
with the candidate execution environment;
outputting a first indicator that indicates the recommen-
dation information; and
transferring the workload from a storage location of the
workload to the first execution environment.

15. The non-transitory computer-readable storage
medium of claim 14, the operations further comprising:
determining the execution information for the set of
candidate execution environments;
for each candidate execution environment of the set of
candidate execution environments, determining the
execution information associated with the candidate
execution environment, the execution information
associated with the candidate execution environment
indicates:
a predicated carbon intensity value for the candidate
execution environment,
a transfer energy costs associated with transferring the
workload to the candidate execution environment,
the transfer energy cost based on a location of the
candidate execution environment, a distance
between the first execution environment and the
candidate execution environment, network informa-
tion, or a combination thereof; and
a carbon intensity average value based on a duration
associated with a duration of processing the work-
load at the candidate execution environment, a
power usage effectiveness value of the candidate
execution environment, or a combination thereof.

16. The non-transitory computer-readable storage
medium of claim 14, wherein the recommendation informa-
tion is generated based on:

multiple workloads that includes the workload,
the set of candidate execution environments,
scheduling information associated with each candidate
execution environment of the set of candidate execu-
tion environments,
for each candidate execution environment of the set of
candidate execution environments:
the carbon intensity value of the candidate execution
environment,
an infrastructure cost of the candidate execution envi-
ronment,
a provisioning time of the candidate execution envi-
ronment,
a service level agreement or latency associated with the
candidate execution environment, or
a combination thereof,
a cost threshold or an energy efficiency threshold, and
a weather prediction.

17. The non-transitory computer-readable storage
medium of claim 14, the operations further comprising:
receiving a second indicator that indicates an acceptance
of the first execution environment for processing of the
workload;
based on the second indicator:
generating a schedule of the workload to indicate the
processing of the workload at the first execution
environment at a first time;
provisioning the first execution environment for the pro-
cessing of the workload; and
initiating the processing of the workload by the first
execution environment.

18. The non-transitory computer-readable storage
medium of claim 14, the operations further comprising:
receiving scheduling information that indicates that the
workload that is scheduled for processing at a second
execution environment at a second time;
selecting the first execution environment from the set of
candidate execution environments;
transferring the workload from the second execution
environment to the first execution environment; and
initiating processing of the workload by the first execution
environment.

* * * * *